Patented July 30, 1946

2,404,781

UNITED STATES PATENT OFFICE 2,404,781

VINYL POLYMERS

Harold W. Arnold, Wilmington, Del., Merlin Martin Brubaker, Boothwyn, Pa., and George L. Dorough, Niagara Falls, N. Y., assignors to E. I. du Pont de Nemours & Company, Wilmington, Del., a corporation of Delaware No Drawing. Application January 23, 1942, Serial No. 427,922

2 Claims. (Cl. 260—84)

This invention relates to vinyl polymers and to a process for obtaining them. More particularly it relates to polymers and copolymers of vinyl halides and to an improved process for their preparation.

It is well known that vinyl halides, especially vinyl chloride, are characterized by a relatively slow rate of polymerization. For example, although vinyl chloride can be polymerized more rapidly in emulsion than in any other physical state, the most effective systems known produce only very slow polymerization at moderate temperatures such as up to 45° C. It is not feasible to overcome this difficulty by increased temperatures, since for many uses the most desirable products are those prepared at 45° C. or below. As a consequence, polymerization of vinyl chloride according to the teachings of the art is a slow, uneconomical process, which cannot be applied efficiently to production on a large scale. Furthermore, copolymerization of vinyl chloride with polymerizable compounds possessing different speeds of polymerization frequently results in non-homogeneous products.

This invention has as its object to provide a practical and efficient process for the production of high quality polymers of vinyl halides. Another object is to provide a practical and efficient process for the production of high quality homogeneous copolymers of vinyl halides with other polymerizable compound. Still another object is to provide a method for polymerization of vinyl halides with great rapidity at moderate temperatures. Another object is to provide new and valuable plastic masses hitherto unobtainable. Other objects will be apparent from the following description of the invention.

These objects are accomplished by the following invention which comprises polymerizing the polymerizable components of an emulsion of a vinyl halide either alone or in admixture with at least one polymerizable unsaturated compound in an aqueous medium containing a dissolved salt of perdisulfuric acid and a dispersing agent selected from the group consisting of

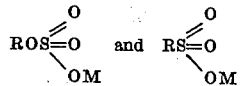

wherein R is an acyclic hydrocarbon of 12 to 18 carbon atoms and M is an alkali metal.

The exact manner of practicing this invention will vary depending upon the particular components processed, the amounts used, and the dispersing agent. However, the following will illustrate its application.

An aqueous medium containing about 0.1 to 2.0% of a perdisulfate salt and about 1 to 5% of a dispersing agent as defined above is adjusted to a pH of about 2 to 4 by the addition of acids or acid reacting salts. This medium is then placed in a suitable pressure vessel, which is provided with a means of agitation, followed by about one-half its weight of vinyl chloride or mixture of vinyl chloride and at least one other polymerizable compound. In most cases it is preferable to displace the air in the free space of the vessel by an inert gas such as nitrogen, provided the contents are chilled below the boiling point of vinyl chloride, and the vessel is then closed. It is thereafter heated at a constant temperature in the range of 30° to 50° C. with constant or intermittent agitation until polymerization has proceeded to the desired extent.

The following examples, in which the parts are given by weight, further illustrate the practice of this invention.

Example I

The following solution is prepared:

| | Parts |
|---|---|
| Water | 142.5 |
| Sodium cetyl sulfate (a commercial dispersing agent containing about 22% active ingredient) | 6.0 |
| Acetic acid | 0.95 |
| Ammonium perdisulfate | 0.75 |

The pH of this solution is approximately 2.6. One hundred thirty-seven parts of this solution is introduced into a glass pressure vessel and the vessel cooled below the boiling point of vinyl chloride. Seventy parts of liquid vinyl chloride is then added and the tube sealed. It is then warmed until the contents are completely liquified and the vessel is thereafter agitated to 35 to 40° C. for a total of 16 hours. The vessel is then cooled below the boiling point of vinyl chloride and opened. On warming the frozen aqueous dispersion, it is found that the vinyl chloride polymer has precipitated as a dense white powder which if filtered off and washed thoroughly with water until substantially all residual dispersing agent has been removed. It is thereafter air dried to constant weight. The polymer amounts to 63 parts.

*Example II*

The following solution is prepared:

| | Parts |
|---|---|
| Water | 142.5 |
| The sodium salt of sulfated oleyl alcohol (a commercial dispersing agent available in powdered form which contains 32% active ingredient) | 6.0 |
| Acetic acid | 0.95 |
| Ammonium perdisulfate | 0.75 |

The pH of this solution is about 2.5. On conducting the polymerization of vinyl chloride with this aqueous dispersion exactly as in Example I, there is obtained 67.5 parts of vinyl chloride polymer. When the polymerization of vinyl chloride is conducted in a similar manner, except that 12 parts of a 50% solution of acetoxyoctadecane sulfate sodium salt is used as the dispersant, only one part of polymer is produced.

When the polymerization of vinyl chloride is conducted as in the first paragraph of this example, except that 1.5 parts of 30% hydrogen peroxide is substituted for the ammonium perdisulfate, the vinyl chloride polymer obtained amounts to only about 1.5 parts.

*Example III*

A solution of the following composition is prepared:

| | Parts |
|---|---|
| The dispersing agent described in Example I | 17.9 |
| Ammonium perdisulfate | 1.0 |
| Glacial acetic acid | 1.26 |
| Water | 180.8 |

The pH of this solution is found to be 2.6. One hundred parts of this dispersing agent and 50 parts of monomeric vinyl chloride are introduced into a tube and polymerized as in Example I, except that polymerization is conducted at 40° C. for 10 hours with frequent agitation. By freezing the dispersion as in Example I, there is obtained 46 parts of vinyl chloride polymer.

When the ammonium perdisulfate of this example is replaced by 3.33 parts of 30% hydrogen peroxide and the polymerization conducted as before, no vinyl chloride polymer can be detected in working up the reaction mixture.

*Example IV*

The following solution is prepared:

| | Parts |
|---|---|
| The sodium salt of sulfonated paraffin oil (a commercial dispersing agent of approximately 32% active ingredient concentration and which is essentially identical to that described in Example III of U. S. Patent 2,197,800) | 31.2 |
| Ammonium perdisulfate | 1.25 |
| Water | 463.5 |

The pH of this solution is adjusted to 2.5 by adding a suitable amount of 89% formic acid. Fifty parts of this solution and 25 parts of vinyl chloride are charged into a glass pressure vessel as in Example I, the free space of the vessel having been swept out with nitrogen before sealing. After the contents of the pressure vessel have become completely liquified, the vessel is agitated in a bath maintained at 40° C. for 4 hours. At the end of this time the polymer is isolated as in Example I. The polymer obtained amounts to 25 parts, corresponding to a yield of 100%. A 10% solution in cyclohexanone of the polyvinyl chloride obtained in this example shows a viscosity of 5.9 poises, indicating a high molecular weight.

*Example V*

The following dispersing solution is prepared:

| | Parts |
|---|---|
| The dispersant described in Example IV | 50 |
| Water | 748 |
| Ammonium perdisulfate | 2 |

The pH is adjusted to 2.5 by the appropriate addition of formic acid. One hundred parts of this solution is introduced together with 45 parts of vinyl chloride and 5 parts of methyl acrylate into a suitable glass pressure vessel as in Example I. The air in the vessel is swept out with nitrogen and the vessel sealed. It is thereafter agitated at 40° C. for a total of 7 hours. At the end of this time the polymer is isolated as in Example I. The polymer obtained amounts to 47.2 parts, corresponding to a yield of 94.4%. It may be molded at 150° C. into clear, transparent, light-colored, very tough articles which show excellent resistance to shock.

When the polymerization is run exactly as above except in the presence of atmospheric oxygen, only 35.4 parts of polymer are obtained. There are no apparent differences in the properties of the products prepared in the presence or absence of oxygen.

*Example VI*

A mixture of 45 parts of vinyl chloride and 5 parts of asymmetrical dichloroethylene is polymerized exactly as in Example 5, and there is obtained 45.5 parts of copolymer. This corresponds to a yield of 91% of theory. The polymer is readily soluble in dioxan, methyl ethyl ketone, cyclohexanone and ethylene dichloride. It can be molded into tough, resilient articles.

The polymerization in the presence of atmospheric oxygen, yields 30.7 parts of copolymer.

*Example VII*

A mixture of 60 parts of vinyl chloride and 10 parts of methyl methacrylate is polymerized exactly as in Example V, and there is obtained 56 parts of polymer which when molded at 150° C. yields transparent, light-colored, tough articles. A molded bar 5" in length, ½" in width, and ⅛" in thickness can be bent sharply without breaking.

*Example VIII*

A mixture of 44 parts of vinyl chloride and 6 parts of diethyl maleate is polymerized as in Example IV, except that polymerization is carried out for a total of 16 hours at 40° C. There is thus obtained 43.4 parts of polymer which is shown by chlorine analysis to contain 86.5% vinyl chloride. The polymer can be molded to a very tough, transparent article which can be deformed under stress at a temperature of about 76° C.

*Example IX*

A mixture of 44 parts of vinyl chloride and 6 parts of methyl alpha-chloroacrylate is polymerized as in Example IV and yields 43.7 parts of polymer which can be molded to clear, tough articles.

Example X

A mixture of 44 parts of vinyl chloride and 6 parts of methylene diethyl malonate is polymerized as in Example IV and yields 42.8 parts of polymer having good clarity and strength.

It should be pointed out that the combination of a perdisulfate salt and a dispersant as defined herein illustrated in the foregoing examples is both unique and superior to any other catalyst-dispersing agent combination hitherto disclosed. The rapidity with which polymerization takes place, even in the presence of oxygen, which is known to inhibit the polymerization of vinyl halide, is strikingly surprising. The comparisons between our preferred combination of perdisulfate-dispersing agent and other combinations given above lend additional support to the unique effectiveness of the combination of catalyst-dispersing agent embodied in this invention. It should be further pointed out copolymers prepared using this invention are more homogeneous and higher in molecular weight than those produced using ordinary emulsion processes.

This invention is generic to the polymerization of vinyl halides, especially vinyl fluoride, vinyl chloride, and vinyl bromide. Among these compounds vinyl chloride is polymerized most satisfactorily by the process of this invention, and is preferred. As indicated in the foregoing examples the process is also applicable to the polymerization of vinyl halides in the presence of other materials which contain an ethylenic bond capable of vinyl polymerization. This provides an uniquely effective means for obtaining copolymers of vinyl chloride with the following substances included among which are esters of monocarboxylic acids with monohydric alcohols, said esters containing a single terminal ethylenic double bond: Methyl methacrylate, ethyl methacrylate, butyl methacrylate, octyl methacrylate, 2-nitro-2-methyl propyl methacrylate, methoxyethyl methacrylate, chloroethyl methacrylate, phenyl methacrylate, cyclohexyl methacrylate, and the corresponding esters of acrylic acid; acrylo- and methacrylonitrile, acryl- and methacrylamide or mono-alkyl substitution products thereof; unsaturated ketones such as methyl vinyl ketone, phenyl vinyl ketone and methyl isopropenyl ketone; asymmetrical dichloroethylene, vinyl carboxylates such as vinyl acetate, vinyl chloroacetate, vinyl propionate, and vinyl stearate, ethylene-alpha-beta-dicarboxylic acids, or their anhydrides or derivatives such as diethyl fumarate, diethyl maleate, citraconates and mesaconates; mono-olefines and substitution products thereof as isobutylene and the like. With regard to copolymerization, this invention is chiefly concerned with mixtures of vinyl chloride and one other operable monomer which contain from 5–95% of vinyl chloride by weight. It is apparent that the properties of the copolymers will depend largely on the type and amount of the other ingredient to be copolymerized with vinyl chloride. It is within the scope of the invention to polymerize vinyl chloride conjointly with two or more compounds which contain an ethylenic bond capable of vinyl polymerization.

The polymerization catalysts encompassed by this invention are the water-soluble salts of perdisulfuric acid. In addition to the ammonium salt disclosed in the examples, there may also be used the sodium, potassium, lithium, barium, magnesium, and calcium perdisulfates. It is observed that the sulfate ion appears in aqueous solutions of perdisulfates. For this reason, while the water-soluble alkaline earth metal salts are operable, they are not usually used because of their tendency to form a precipitate of the corresponding alkaline earth sulfate. The preferred salts are the ammonium and alkali metal salts. Ammonium perdisulfate is especially suitable for economic considerations.

The concentration of perdisulfate salt employed may be varied within wide limits. For instance, amounts of perdisulfates varying from 0.1% to 10% of the quantity of monomer employed are operable. In respect to economy of catalyst, quality of product and rapidity of polymerization, the preferred proportion of perdisulfate salt lies in the range of 0.1 to 4% based on weight of monomer.

As operable dispersing agents in addition to those disclosed in the foregoing examples, there may be mentioned the alkali metal salts of the following long chain alkyl sulfates and sulfonates: Dodecyl-1 acid sulfate, tetradecyl-1 acid sulfate, octadecyl-1 acid sulfate, dodecane-1-sulfonic acid, tetradecane-1-sulfonic acid, hexadecane-1-sulfonic acid and octadecane-1-sulfonic acid. The salts of long chain sulfonated paraffin oil hydrocarbons are especially effective dispersants and need be employed only in small proportions to achieve the desired results. It will be understood that the dispersants to which reference is made above are commercial materials which, because of the methods used in their manufacture and because of the sources of the starting materials, are usually not produced in high state of purity and contain minor constituents which influence the effectiveness of the active ingredient. Polymerization systems containing such ancillary ingredients, which are present adventitiously or added deliberately, are recognized as part of this invention. These ingredients, which are only useful when an operable dispersant is also present, may include inorganic salts, long chain primary alcohols, carbohydrate derivatives, polyvinyl alcohol, etc.

Using the rate of polymerization as a criterion, the invention contemplates the use of dispersing agent active ingredient in concentrations of 0.2 to 5% based on the weight of the aqueous medium in which the polymerization and copolymerization of vinyl chloride is brought about. Within this range, the preferred concentration will in general depend upon the proportion of monomer present, but is usually from 0.5 to 3%. From the standpoint of economy and to facilitate removing the dispersing agent from the polymerized product, it is customary to use approximately the smallest amount of dispersing agent which promotes polymerization at the desired rate. It is to be understood that when reference is made to the use of definite percentages of dispersing agents, these values are calculated on the basis of the known active ingredient concentration in the commercial dispersants.

It may also be pointed out that the effectiveness of the dispersing agent, especially if small concentrations are employed, is enhanced by agitation of the mixture. Any method of agitation may be used in producing and maintaining the emulsions. The most commonly employed method of mixing is stirring, preferably in vessels containing suitable baffles. Other methods include shaking, tumbling and the use of turbo-mixers. The dispersing agents operable in this invention are in general useful in forming stable emulsions, which after they are once formed, require little or no agitation thereafter. It has been found, however, that polymerization occurs more rapidly in certain emulsions while they are being agitated. It is accordingly preferred to assist the dispersing agent in producing and maintaining the emulsion by mechanical means which may or may not be continuous. It should be emphasized that the dependence of the efficiency of the dispersing agents upon the active ingredient concentration and agitation in no way repudiates the sharp distinction previously noted between the dispersing agents operable in this invention and those which are not. Thus, with most of the inoperable or impractical dispersing agents, it is impossible to obtain the rapid rate characteristic of the operable agents either by continuous vigorous agitation or by the use of concentrations as high as the solubility of the material will permit. Even in instances where such modifications of systems involving impractical dispersing agents permit sufficient acceleration of the polymerization rate, the process is not practicable because of the expense and operating difficulties entailed by the use of very high proportions of such dispersing agents.

The process of this invention may be carried out in alkaline, acid or neutral media. However, it is preferred to carry out the polymerization in an aqueous medium whose pH may vary from about 1 to about 5 since this range appears to enhance the polymerization rate of vinyl chloride. It is realized, however, that in copolymerizations, the pH of the aqueous media will be governed to a considerable extent by the nature of the monomer which is conjointly polymerized with vinyl chloride. For example, when vinyl esters of carboxylic acids are employed care must be taken to prevent the hydrolysis of the ester. Since the polymerization, in general, proceeds more slowly in environments of low acidity and since high acidity may cause excessive corrosion of the polymerization vessel, it is preferred to conduct polymerization in aqueous media with pH values of about 2 to about 4. If it is desired to avoid changes in pH during the course of polymerization, suitable buffers may be added to the aqueous medium.

The operability of the invention is not confined to any particular proportion of polymerizable monomer or monomers relative to the amount of aqueous media present. Thus, the ratio of the aqueous to the non-aqueous phase may vary between approximately 10:1 and 1:1. In general, it is preferred to employ aqueous/non-aqueous ratios between approximately 4:1 and 1:1, since for a given reaction vessel the time-space yield is greatly reduced by the use of higher ratios. It can further be said that higher aqueous/non-aqueous ratios generally tend to favor the production of lower molecular weight products. It is also helpful in maintaining an emulsion if the proportion of non-aqueous to aqueous phases is not greater than 1:1.

As is well known, the dependence of the rate of vinyl polymerization upon the temperature is very important, and low temperatures cannot be generally used because the corresponding rate of reaction is impracticably low. The present invention, however, can be operated at any temperature above the freezing point of the aqueous phase which is somewhat below 0° C. up to about 80° C., above which the product may be adversely affected by the aqueous medium. It is preferred to employ temperatures in the range of 30° C. to 50° C.

It is realized that the presence of oxygen in the polymerization vessel, while not appearing to have a deleterious effect on the properties of the polymers of this invention, may adversely affect the rate of polymerization in certain cases. In these cases it is, therefore, preferable to displace the air from the polymerization vessel by means of a gas which does not reduce the rate of polymerization. Suitable gases are nitrogen, carbon dioxide, methane and helium. These gases may be passed through the free space of the polymerization vessel until the air has been completely displaced or may be introduced under sufficiently high pressure that the oxygen originally present is so greatly diluted as to have little effect on the rate of polymerization.

The process is not limited to any particular apparatus, but it is important that the reaction vessel shall be constructed of material which has no effect on the rate of polymerization or on the quality of the products and is not affected by the aqueous medium used in carrying out the polymerization. Suitable vessels may be constructed of stainless steel, nickel, silver, or lead. Vessels equipper with glass or enamel liners may also be used.

The copolymerization procedure generally followed in the present invention involves the addition of the entire amounts of each of the two polymerizable compounds to the aqueous medium followed by subsequent emulsification and polymerization of the aqueous dispersion. It is well known that the polymerization rate of the monomers operable in this invention may vary to a considerable extent, and also it may be found in copolymerizing vinyl chloride with one of the operable monomers, that one of the monomeric materials polymerizes more rapidly than the other, thus giving rise to products which may be characterized by non-homogeneity and other inferior physical properties. These effects are avoided to a great extent by using the invention. However, if additional improvement is desired, the polymerization process may be modified by mixing initially all of the more slowly polymerizing material and a small proportion of the more rapidly polymerizing monomer with the aqueous medium, and thereafter adding small portions of the more rapidly polymerizing monomer at about the rate at which this material is used up. The emulsion process of this invention is also adapted to be carried out in a continuous fashion.

At the conclusion of polymerization the products of this invention may be isolated as finely divided powders by a variety of methods. For example, the dispersion may be sprayed into a heated and/or exacuated chamber whereby the water is removed as vapor and the polymer falls to the bottom of the chamber. The polymer may also be isolated by cooling the dispersion below the freezing point of the aqueous medium or by the addition of a large volume of a lower aliphatic alcohol such as methanol or ethanol. The most satisfactory method consists in adding an appropriate amount of an electrolyte solution to the diluted aqueous dispersion with rapid agitation at a temperature just below the point at which the precipitated particles tend to cohere. This procedure yields a polymer in the form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer, it is filtered and washed repeatedly with water to remove traces of electrolyte and dispersing agent which may adhere to the particles. Washing with dilute solutions (0.1 to 1%) of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol such as methanol or ethanol. Before precipitation it may be advantageous to add to the dispersion small amounts of heat and light stabilizers such as epichlorohydrin, 1-phenoxy-2, 3-epoxypropane, 1-p-tolyloxy-2, 3-epoxypropane, alpha, alpha-dimethyl glycide and ethyl glycidate; cadmium, copper, lead and manganese salts of oleic, linoleic, stearic, ricinoleic, palmitic, lauric and fatty oil acids generally; eugenol, butyl salicylate and guaiacol; glycine, leucine, alanine, and the m-octyl ester of C-dimethyl glycine; and 4-cyclohexyl morpholine. In general, monocarboxylic acid amides, preferably of the secondary or N-monosubstituted type, having heavy hydrocarbon residues, preferably in the form of long open chains, may be used advantageously as stabilizers. Specific compounds of this type include N-(2-methyl-3-hydroxylpropyl) amide of 10-undecenoic acid, N-isobutylamide of naphthenic acids, N-isobutyl lauramide, N-allylamide of 10-undecenoic acid, N-(p-ethoxyphenyl) amide of 10-undecenoic acid, amides of castor oil acids, N-isobutylamide of 10-undecenoic acid, N-isobutylamide of oleic acid, N-isobutylamide of coconut oil acids, and the mixture of N-alkyl-amides of carbamic acid in which the alkyl groups correspond in size and proportion to those present in the higher alcohols obtained by catalytic hydrogenation of carbon oxides. It may also be of advantage to add small amounts of plasticizers such as dibutyl phthalate, tricresyl phosphate, and dibutyl sebacate.

In the event the products are to be used as coating or impregnating agents for porous materials, it is possible to apply the emulsions directly to the material to be coated without the intermediate isolation of the polymer.

The products prepared according to the present invention may be used for the preparation of plastics, coatings, films, foils, fibers, and adhesives. For any of these purposes, the polymers may be combined with or prepared in the presence of plasticizers, stabilizers, fillers, pigments, dyes, softeners, natural resins or other other synthetic resins.

As many apparently widely different embodiments of this invention may be made without departing from the spirit and scope thereof; it is to be understood that this invention is not to be limited to the specific embodiments shown and described.

We claim:

1. A polymerization process for obtaining a resinous material which consists in emulsifying in an aqueous medium a mixture of a vinyl halide with an alkyl ester of an alpha-methylene aliphatic monocarboxylic acid, employing a 5–95% by weight amount of vinyl halide in said mixture, said medium having a ratio of aqueous to non-aqueous phase of from between 10:1 and 1:1 and containing from 0.1% to 4%, based on the weight of monomers employed, of a dissolved salt of perdisulfuric acid, and from 0.5% to 3%, based on the weight of the aqueous medium, of a dispersing agent selected from the group consisting of

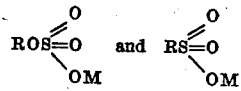

wherein R is an acyclic hydrocarbon containing 12–18 carbon atoms and M is an alkali metal, and then polymerizing the emulsified mixture at a temperature ranging from 0° C. to 80° C.

2. A polymerization process for obtaining a resinous material which consists in emulsifying in an aqueous medium a mixture of vinyl chloride and methyl methacrylate, employing a 5–95% by weight amount of vinyl chloride in said mixture, said aqueous medium having a pH within a range of from 2 to 4, a ratio of aqueous to non-aqueous phase of from between 10:1 and 1:1, and containing from about 0.1% to 4%, based on the weight of monomers employed, of dissolved ammonium perdisulfate and from 0.5% to 3%, based on the weight of the aqueous medium, of the sodium salt of sulfonated paraffin oil as a dispersing agent, and then maintaining the resulting emulsion at a constant temperature within a range of from 30–50° C. until polymerization of the polymerizable components in said emulsion becomes effected.

HAROLD W. ARNOLD.
MERLIN MARTIN BRUBAKER.
GEORGE L. DOROUGH.